(12) United States Patent
Takayama et al.

(10) Patent No.: US 6,321,633 B1
(45) Date of Patent: Nov. 27, 2001

(54) BOOSTER

(75) Inventors: Toshio Takayama; Kunihiro Matsunaga; Takuya Obata, all of Yamanashi-ken (JP)

(73) Assignee: Tokico Ltd., Kawasaki ( * ) Notice: Subject to any disclaimer, the term of this patent is extended or adjusted under 35 U.S.C. 154(b) by 0 days.

(21) Appl. No.: 09/559,575

(22) Filed: Apr. 28, 2000

(30) Foreign Application Priority Data

Apr. 30, 1999 (JP) .................................................. 11-125076

(51) Int. Cl.⁷ .......................................................... F15B 9/03
(52) U.S. Cl. ............................................................ 91/367
(58) Field of Search .................................. 91/367, 376 R (56) References Cited

U.S. PATENT DOCUMENTS

| | | | |
|---|---|---|---|
| 5,460,074 | * 10/1995 | Balz et al. ............................. | 91/369.1 |
| 5,483,866 | * 1/1996 | Schluter ................................ | 91/367 |
| 5,493,946 | * 2/1996 | Schluter ................................ | 91/367 |
| 5,605,088 | * 2/1997 | Balz et al. ............................. | 91/369.1 |
| 5,611,257 | * 3/1997 | Eick ....................................... | 91/367 |
| 5,690,015 | * 11/1997 | Michels et al. ....................... | 91/369.1 |
| 5,779,326 | * 7/1998 | Feigel et al. .......................... | 303/114.3 |
| 5,937,727 | * 8/1999 | Klesen et al. ......................... | 91/367 |
| 6,044,750 | * 4/2000 | Eick et al. ............................. | 91/367 |
| 6,082,241 | * 7/2000 | Kobayashi et al. .................. | 91/367 |
| 6,155,156 | * 12/2000 | Takasaki et al. ..................... | 91/367 |
| 6,161,463 | * 12/2000 | Suwa ..................................... | 91/367 |
| 6,203,118 | * 3/2001 | Takayama et al. ................... | 303/113.4 |

* cited by examiner

*Primary Examiner*—John E. Ryznic
(74) *Attorney, Agent, or Firm*—Wenderoth, Lind & Ponack, L.L.P.

(57) ABSTRACT

The present invention provides a booster in which magnitude of output can be adjusted also by an operation of a solenoid mechanism. An armature (13) is shifted to the right (in FIG. 1) in opposition to a returning spring by applying electricity to a solenoid (39), with the result that a space (80) on one end of the armature is communicated with a constant pressure chamber (5) through a passage (T3). When an electromagnetic force acting on the armature (13) exceeds a predetermined value, a distal end of a valve member (28) is shifted to the right (in FIG. 1) via a cylindrical member (31) to open an atmospheric valve (34), thereby introducing the atmosphere into a variable pressure chamber (6). The pressure in the variable pressure chamber is applied to the other end of the armature and the difference in the pressure tends to move the armature toward its home position.

14 Claims, 4 Drawing Sheets

BOOSTER

BACKGROUND OF THE INVENTION

The present invention relates to a booster of control type capable of automatically increasing and decreasing an output by electromagnetically operating an atmospheric valve or a vacuum valve.

As an example of a conventional booster of this kind, as disclosed in Japanese Patent Laid-open No. 7-503124 (1995), there is a booster in which a solenoid mechanism is incorporated into a valve body, and a movable member of the solenoid mechanism is shifted by applying electricity to a solenoid of the solenoid mechanism, and a valve mechanism (atmospheric valve or vacuum valve) is opened by the shifting movement of the movable member, independently from the valve operation based on displacement of an input rod cooperating with a brake pedal.

In the booster having the above-mentioned solenoid mechanism, similar to the output in a case where the booster is operated by operating the valve mechanism by the input rod cooperating with the brake pedal, it is desired that the output can also be adjusted within a wide range by the operation of the solenoid mechanism.

However, in the above-mentioned conventional technique, the solenoid mechanism merely controls an opening amount of the valve mechanism on the basis of magnitude of an electric current supplied to the solenoid, but, there is no mutual relationship (proportional relationship) between the magnitude of the electric current supplied to the solenoid mechanism and magnitude of the output of the booster.

Thus, in order to control the output of the booster to desired magnitude by the operation of the solenoid mechanism, for example, as is in an output signal of a master cylinder pressure sensor for detecting pressure of braking liquid outputted from a master cylinder, it is required that a signal corresponding to the output of the booster be fed-back to control the operation of the solenoid mechanism.

To this end, since a sensor for outputting a signal corresponding to the output of the booster such as the master cylinder pressure sensor must be provided additionally, the entire system becomes more expensive.

SUMMARY OF THE INVENTION

The present invention aims to eliminate the above-mentioned conventional drawback, and an object of the present invention is to provide a booster having a simple construction, in which magnitude of an output can be adjusted within a wide range also by an operation of a solenoid mechanism.

According to one aspect of the present invention, there is provided a booster wherein an interior of a housing is divided into a constant pressure chamber and a variable pressure chamber by a power piston, and a valve mechanism for controlling supply of operating fluid to the variable pressure chamber by a shifting movement of a plunger connected to an input rod cooperating with a brake pedal is provided within a valve body supported by the power piston, so that a thrust force generated on the power piston by pressure difference created between the variable pressure chamber and the constant pressure chamber based on an operation of the valve mechanism is outputted. The booster further comprises an electromagnetic biasing means having a movable member slidably provided within the valve body and having one end for operating the valve mechanism independently from an operation of the input rod, whereby the pressure in the variable pressure chamber acts on one end of the movable member and pressure in the constant pressure chamber acts on the other end of the movable member.

According to another aspect of the present invention, there is provided a booster wherein an interior of a housing is divided into a constant pressure chamber and a variable pressure chamber by a power piston, and a valve mechanism for controlling supply of operating fluid to the variable pressure chamber by a shifting movement of a plunger connected to an input rod cooperating with a brake pedal is provided within a valve body supported by the power piston, so that a thrust force generated on the power piston by pressure difference created between the variable pressure chamber and the constant pressure chamber based on an operation of the valve mechanism is transmitted to an output shaft via a reaction disc. The booster further comprises an electromagnetic biasing means having a movable member slidably provided within the valve body for operating the valve mechanism independently from an operation of the input rod, and a reaction force transmitting member for transmitting a part of a reaction force from the reaction disc to the movable member.

DETAILED DESCRIPTION OF THE INVENTION

Now, a booster according to a first embodiment of the present invention will be explained with reference to FIGS. 1 and 2.

Figure 1:
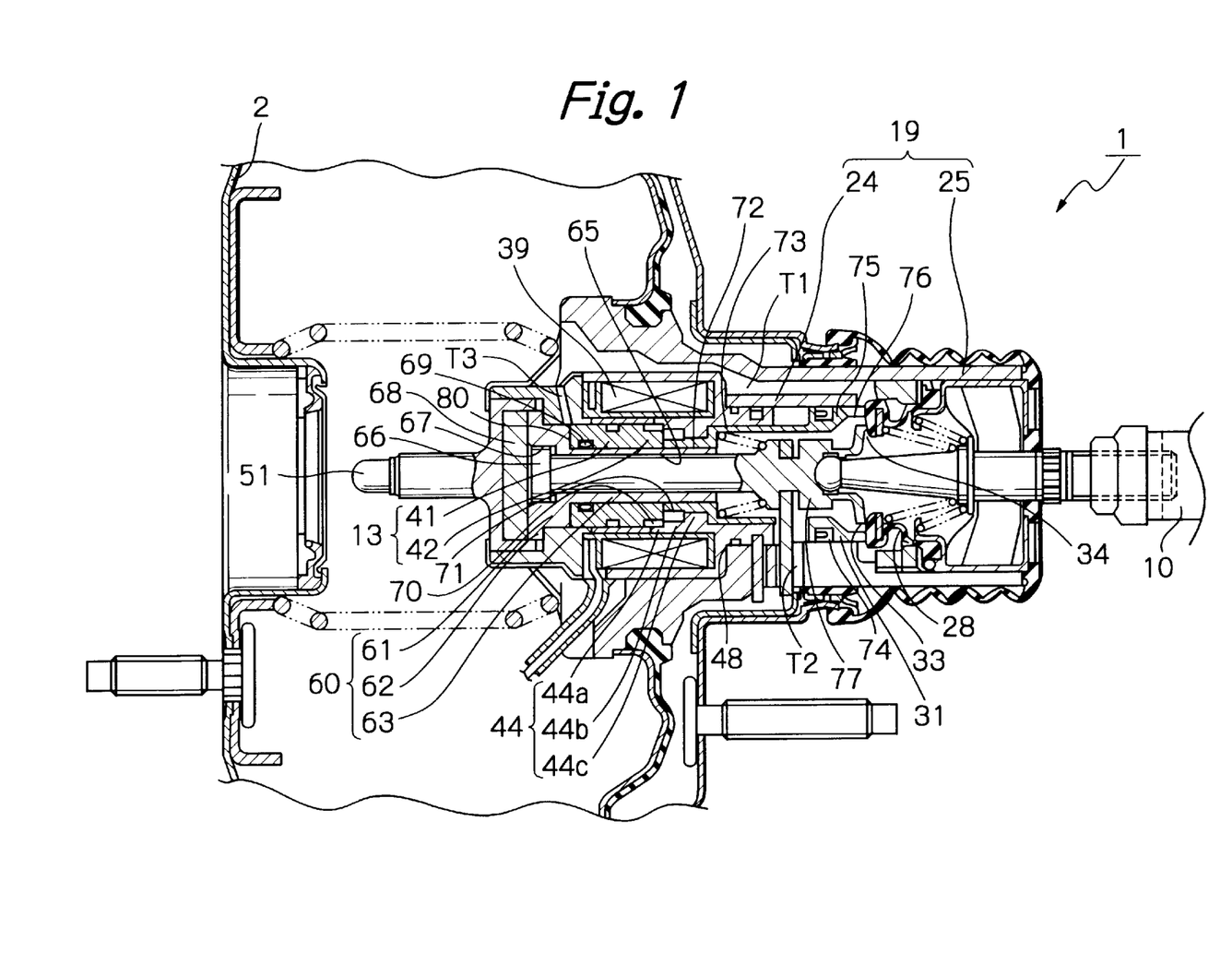
FIG. 1 is a sectional view showing a first embodiment of the present invention (a partial enlarged view of FIG. 2)
Figure 2:
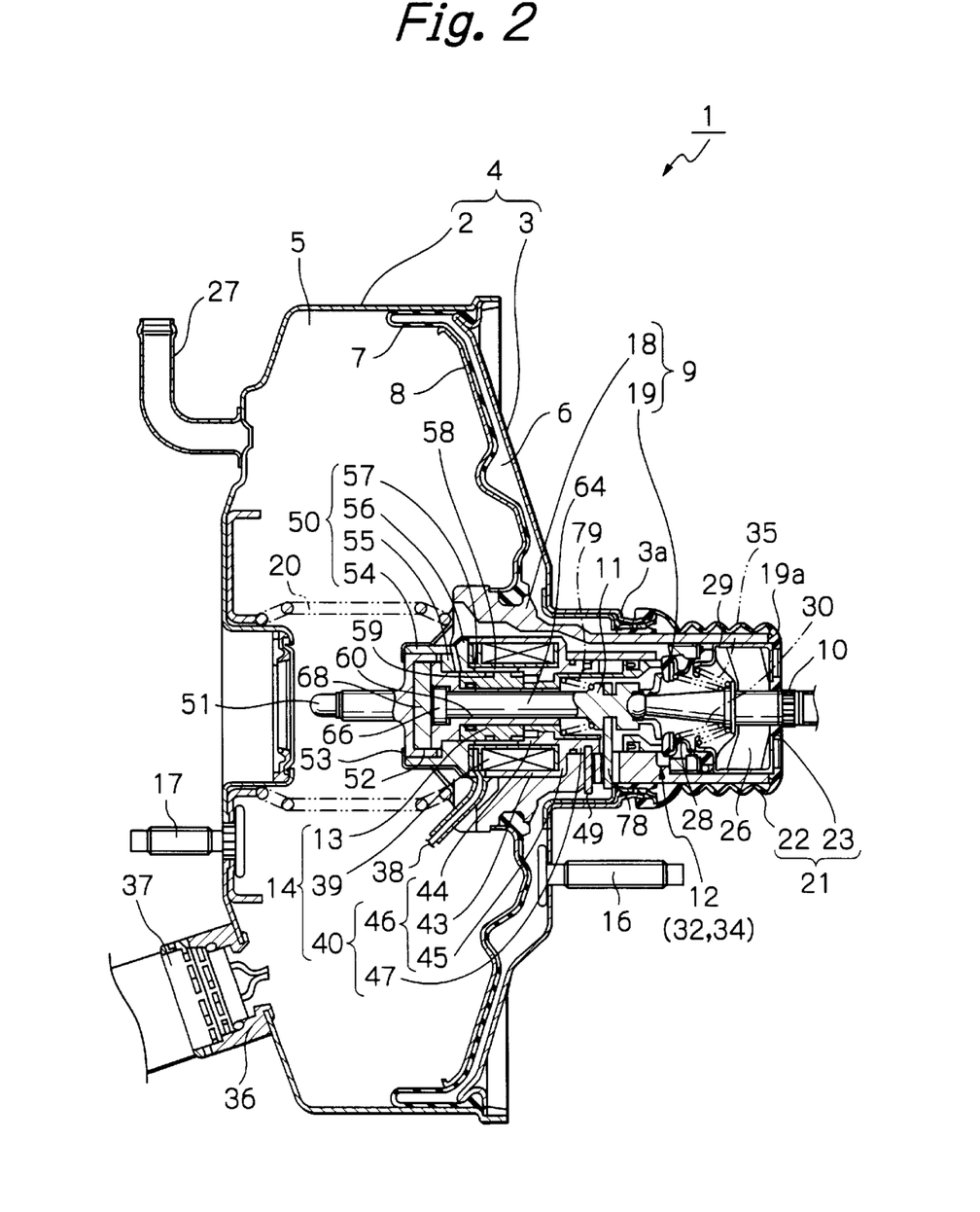
FIG. 2 is a sectional view showing a booster of FIG. 1.

In FIGS. 1 and 2, a booster 1 generally comprises a housing 4 including a front shell 2 and a rear shell 3, a power piston having a diaphragm 7 and provided within the housing 4 to divide the interior of the housing 4 into a constant pressure chamber 5 and a variable pressure chamber 6, a substantially cylindrical valve body 9 sealingly fitted in a hole (not numbered) formed in the power piston 8 and supported by the power piston 8, a plunger 11 connected to an input rod 10 cooperating with a brake pedal (not shown) and disposed within the valve body 9, a valve mechanism 12 disposed within the valve body 9 and adapted to control supply of operating fluid to the variable pressure chamber 6 by a relative movement of the plunger 11 with respect to the valve body 9, and a solenoid mechanism (electromagnetic biasing means) 14 disposed within the valve body 9 and adapted to operate the valve mechanism 12 by an armature (movable member) 13 independently from an operation of the input rod cooperating with the brake pedal.

The booster is attached to a vehicle body (not shown) via a stud bolt 16 provided on the rear shell 3. Further, a master cylinder (not shown) is attached to the booster via a stud bolt 17 provided on the front shell 2.

The valve body 9 comprises a valve body large diameter cylindrical portion 18 sealingly fitted in the power piston 8, and a cylindrical extension 19 connected to the valve body large diameter cylindrical portion 18 and extended rearwardly of the rear shell 3 through the rear shell 3 sealingly and slidably, and the valve body is biased toward the right in FIG. 1 by a spring (valve body return spring) 20 disposed between the valve body 9 and the front shell 2.

A boot-shaped cover 21 comprised of a flexible member with a bottom is held between an opening portion 19a of the cylindrical extension 19 and a cylindrical opening portion 3a of the rear shell 3. The cover 21 has a cylindrical cover body 22 having a distal end sealingly held in the cylindrical opening portion 3a of the rear shell 3, and a cover bottom portion 23 connected to the cover body 22. The cover bottom portion 23 has a peripheral edge portion sealingly held in the opening portion 19a of the cylindrical extension 19 and a central portion through which the input rod 10 extends, and ports (not numbered) for communicating with the atmospheric air (operating fluid) are formed between the peripheral edge portion and the central portion.

A portion (referred to as "cylindrical extension thickened portion" hereinafter) 24 of the cylindrical extension 19 near the valve body large diameter cylindrical portion 18 has an inner diameter smaller than that of an opening side portion (referred to as "cylindrical extension opening side portion" hereinafter) 25 and that of the valve body large diameter cylindrical portion 18. That is, the portion 24 is thickened in wall.

The cylindrical extension opening side portion 25 houses therein a filter 26 having a silencer function and an air cleaning function so that the atmospheric air is introduced into the interior of the valve body 9 through the filter 26.

The cylindrical extension thickened portion 24 is provided with a passage T1 extending axially and having one end communicating with the constant pressure chamber 5 through the interior of the valve body large diameter cylindrical portion 18 and the other end open to the cylindrical extension opening side portion 25, and a passage T2 extending radially and having one end open to the variable pressure chamber 6 and the other end open to the interior of the thickened portion.

The constant pressure chamber 5 is connected to a negative pressure source such as a suction portion of an engine (not shown) through a connecting tube 27 so that the chamber 5 is normally maintained to a negative pressure condition.

In the vicinity of an opening of the passage T1 in the cylindrical extension 19, a proximal end of an elastically deformable valve member 28 is secured by a pressing member 29. A valve biasing spring 30 is disposed between a distal end of the valve member 28 and the input rod 10 so that the distal end of the valve member 28 is biased to the left in FIG. 1 to abut against a cylindrical member 31 (valve seat of a vacuum valve 32, described later) and a flange 33 of the plunger 11 (plunger flange 33; valve seat of an atmospheric valve). When the distal end abuts against the cylindrical member 31 (valve seat of the vacuum valve 32), the passage T1 is closed (i.e., the vacuum valve 32 is closed, and, when the distal end abuts against the plunger flange 33 valve seat of the atmospheric valve), communication between the variable pressure chamber 6 and the atmosphere through the passage T2 is blocked (i.e., the atmospheric valve is closed). The vacuum valve 32 is constituted by the valve member 28 and the cylindrical member 31 (valve seat), and the atmospheric valve 34 is constituted by the valve member 28 and the plunger flange 33. In the illustrated embodiment, the valve mechanism 12 is constituted by the vacuum valve 32 and the atmospheric valve 34.

Further, an input rod returning spring 35 is disposed between the pressing member 29 and the input rod 10 so that the input rod 10 is biased rearwardly.

The input rod 10 cooperates with the brake pedal (not shown), and a distal end of the rod is inserted into the cylindrical extension 19.

The distal end of the input rod 10 is connected to a shaft-shaped plunger 11 cooperating with the input rod 10.

The solenoid mechanism 14 generally comprises a solenoid 39 to which a lead wire 38 for a plug 37 sealingly joined to a connector portion 36 provided in the front shell 2 is connected, a solenoid holder 40 formed from magnetic material for holding the solenoid 39, the substantially cylindrical armature (movable member) 13 movable to the right in FIG. 1 by an electromagnetic force generated by applying electricity to the solenoid 39. The armature 13 comprises an armature body 41 having predetermined outer and inner diameters, and an armature small diameter portion 42 connected to the armature body 41 and having an outer diameter smaller than that of the armature body 41 and an inner diameter equal to that of the armature body. The cylindrical member 31 is integrally joined to an end of the armature small diameter portion 42.

The solenoid holder 40 comprises a dual cylindrical portion 46 including an outer cylinder (holder outer cylinder) 43 and an inner cylinder (holder inner cylinder) 44 having a height smaller than that of the holder outer cylinder 43 and in which one ends of the holder outer cylinder 43 and the holder inner cylinder 44 are closed by a bottom plate (holder bottom plate) 45. The solenoid 39 is located between the holder outer cylinder 43 and the holder inner cylinder 44. The solenoid holder 40 further includes a cylindrical extension (holder extension) 47 extending from the closed side of the dual cylindrical portion 46. The holder inner cylinder 44 comprises first, second and third holder inner cylinder portions 44a, 44b, 44c having large, intermediate and small inner diameters reduced steppingly from a distal end to a proximal end of the inner cylinder. The inner diameter of the first holder inner cylinder portion 44a is slightly greater than the outer diameter of the armature body 41. The inner diameter of the second holder inner cylinder portion 44b is slightly greater than the outer diameter of the armature small diameter portion 42.

The solenoid holder 40 is positioned within the valve body 9 by locating the holder outer cylinder 43 in the valve body large diameter cylindrical portion 18 and by opposing the holder bottom plate 45 to a stepped portion 48 between the valve body large diameter cylindrical portion 18 and the cylindrical extension thickened portion 24 in the valve body 9 and by inserting the holder extension 47 into the cylindrical extension thickened portion 24. By fitting a key member 49 inserted in the cylindrical extension thickened portion 24 into a groove (not shown) formed in an outer peripheral portion of the holder extension 47, the solenoid holder 40 is secured to the valve body 9.

Further, a substantially cylindrical output rod fitting member 50 is joined to an opening portion of the dual cylindrical portion 46 of the solenoid holder 40, and a cylindrical portion (output rod cylindrical portion) 52 formed on a proximal end of an output rod 51 connected to a piston of the master cylinder (not shown) is fitted into a distal end of the fitting member 50. The output rod 51 is mounted for axial shifting movement in the opening portion, together with a pressing plate also acting as a spring receiver for the valve body returning spring 20.

The output rod fitting member 50 comprises an output rod fitting member body 54 into which the output rod cylindrical portion 52 is slidably fitted, a cylindrical output rod fitting member bottom portion 55 connected to the output rod fitting member body 54 and having an inner diameter smaller than that of the output rod fitting member body 54 and equal to that of the first holder inner cylinder portion 44a, a flange (output rod fitting member flange) 56 protruded radially outwardly from the cylindrical output rod fitting member bottom portion 55, and a cylindrical protruded portion (output rod fitting member protruded portion) 57 connected to the inner diameter side of the cylindrical output rod fitting member bottom portion 55 and having inner and outer diameters equal to those of the first holder inner cylinder portion 44a. A non-magnetic annular member 58 is disposed between the output rod fitting member protruded portion 57 and the first holder inner cylinder portion 44a. A seal member 59 is disposed between the annular member 58 and the armature body 41.

A substantially cylindrical intermediate member 60 is fitted into and held by the output rod fitting member 50.

The intermediate member 60 comprises an intermediate member body 61 fitted into the output rod fitting member bottom portion 55, a flange (intermediate member flange) 62 protruded radially outwardly from one end (left end in FIG. 1) of the intermediate member body 61 and having an outer diameter smaller than the inner diameter of the output rod fitting member body 54 (and slightly smaller than the inner diameter of the output rod cylindrical portion 52), an extension (intermediate member extension) 63 extending from the other end (right end in FIG. 1) of the intermediate member body 61 and inserted into the armature 13 to slidingly guide the armature 13. The intermediate member 60 is provided with a shaft inserting bore 65 defined by the intermediate member extension 63 into which a plunger shaft 64 is inserted, and a disc housing bore 67 formed in the intermediate member flange 62 and the intermediate member body 61 and having a diameter greater than that of the shaft inserting bore 65 and communicated with the shaft inserting bore 65 and within which a disc 66 formed integrally with a distal end of the plunger shaft 64 and having a diameter greater than that of the shaft inserting bore 65 is housed. A depth of the disc housing bore 67 is greater than a thickness of the disc 66 to generate a jump-in output (described later), and a relationship between the diameters of the disc housing bore 67, shaft inserting bore 65 and disc 66 is selected so that, when the valve body 9 is advanced to precede the plunger 11 and the input rod 10 upon automatic braking (described later), a stepped portion formed between the disc housing bore 67 and the shaft inserting bore 65 abuts against the disc 66, with the result that the plunger 11 and the input rod 10 are also advanced to follow the valve body 9 to transmit a reaction force from the output rod 51 (described later) to the input rod 10.

A reaction disc 68 formed from elastic material such as rubber is disposed between a bottom of the output rod cylindrical portion 52 and the intermediate member 60. Further, a seal member 69 is disposed between the intermediate member extension 63 and the armature 13.

Incidentally, in an initial condition shown in FIG. 1 (in which the input rod 10 is not urged, the solenoid 39 is not energized, and the constant pressure chamber 5 and the variable pressure chamber 6 are maintained to a given constant pressure (negative pressure), the armature body 41 abuts against the other end (right end in FIG. 1) of the intermediate member body 61 of the intermediate member 60, and spaces (movable member operating force assisting mechanism) 70, 71 are formed between the armature body 41 and the second holder inner cylinder 44b and between the armature 13 and the third holder inner cylinder 44c, respectively. The spaces 70, 71 are communicated with the variable pressure chamber 6 so that the spaces 70, 71 are always maintained to the pressure same as that in the variable pressure chamber 6.

The cylindrical member 31 held by the armature 13 is constituted by a cylindrical member small diameter cylindrical portion 72 inserted into the third holder inner cylinder 44c and having an inner diameter equal to that of the armature 13, a cylindrical member intermediate diameter cylindrical portion 73 connected to the cylindrical member small diameter cylindrical portion 72 with a stepped portion (not numbered) therebetween and having an outer diameter slightly smaller than the inner diameter of the holder extension 47, a cylindrical member large diameter cylindrical portion 75 connected to the cylindrical member intermediate diameter cylindrical portion 73 and slidable with respect to the cylindrical extension thickened portion 24 via a seal member 74, and an annular valve seat portion 76 (valve seat portion 76 of the cylindrical member 31; valve seat of the vacuum valve 32) extending axially from the cylindrical member large diameter cylindrical portion 75.

The plunger 11 comprises the shaft portion 64 (plunger shaft 64) inserted into the shaft inserting bore 65 of the intermediate member 60, a plunger proximal end portion 77 connected to the plunger shaft 64 and having a diameter greater than that of the plunger shaft 64 and having a bore (not numbered) into which the distal end of the input rod 10 is fitted, and a flange (the above-mentioned plunger flange 33; valve seat of the atmospheric valve 34) protruded radially outwardly at the end of the plunger proximal end portion 77. The plunger proximal end portion 77 is provided at its outer periphery with an annular groove (not numbered) into which the key member 78 inserted into the passage T2 is fitted, thereby regulating retard displacement of the valve body 9 in the housing 4 and axial relative retard displacement of the plunger 11 with respect to the valve body 9 thereby to set the initial condition shown in FIG. 1.

A return spring 79 (armature 13 (cylindrical member 31) returning spring) is disposed between the plunger proximal end portion 77 and the cylindrical member 31 so that the plunger proximal end portion 77 and the cylindrical member 31 (and thus armature 31) are biased to be away from each other in the axial direction.

A passage T3 open to the inner diameter side and outer diameter side (constant pressure chamber 5) is formed in the output rod fitting member bottom portion 55. In the initial condition, an inner opening of the passage T3 is positioned at the contact area between the intermediate member body 61 of the intermediate member 60 and the armature body 41 so that, when the armature 13 is displaced to the right in FIG. 1, a space 80 formed between the intermediate member body 61 and the armature 13 is communicated with the constant pressure chamber 5 through the passage T3.

Now, an operation of the booster having the above-mentioned construction will be explained.

Regarding the booster 1, in the initial condition shown in FIG. 1 (FIG. 2), the constant pressure chamber 5 and the variable pressure chamber 6 are maintained to the given (negative) pressure, and the atmospheric valve 34 and the vacuum valve 32 are closed. In this condition, when the brake pedal is depressed to urge the input rod 10, the plunger 11 is displaced to the left in FIG. 1 to separate the plunger flange 33 from the valve member 28 thereby to open the atmospheric valve 34, with the result that air flows into the variable pressure chamber through the passage T2, thereby creating pressure difference between the variable pressure chamber 6 and the constant pressure chamber 5. As a result, the power piston 8 and thus the valve body 9 is advanced to generate the thrust force on the output rod 51, thereby starting the braking action.

In this braking initial condition, since the atmospheric valve 34 is opened and the power piston 8 and thus the valve body 9 receives the pressure difference between the variable pressure chamber 6 and the constant pressure chamber 5 to generate the great thrust force on the valve body and thus the output rod 51, an adequate initial braking force (jump-in amount) can be obtained.

After the jump-in, the output reaction force from the output rod 51 is transmitted to the input rod 10 through the reaction disc 68. In this case, a value of the output reaction force transmitted from the output rod 51 to the input rod 10 becomes a value obtained by multiplying a reaction force value from the output rod 51 by a boost ratio (determined by a ratio between an area of the reaction disc 68 and a pressure receiving area of the plunger 11).

In this case, a part of the reaction force from the output rod 51 is transmitted to the brake pedal through the reaction disc 68, thereby providing pedal pressing feeling.

When the magnitude of the reaction force (from the output rod 51) generated by the advancement of the valve body 9 (caused due to the pressure difference between the variable pressure chamber 6 and the constant pressure chamber 5 generated when the atmospheric valve 34 is opened) becomes equal to the brake pedal pressing force, the atmospheric valve 34 is closed. Further, from this condition, when the brake pedal pressing force is increased or decreased to cause imbalance between the magnitude of the reaction force based on the pressure difference and the magnitude of the brake pedal pressing force, the atmospheric valve 34 is opened again or the vacuum valve 32 is opened in place of the atmospheric valve 34 so that the magnitude of the reaction force based on the pressure difference becomes equal to the magnitude of the brake pedal pressing force, thereby adjusting the differential pressure caused between the variable pressure chamber 6 and the constant pressure chamber 5.

Accordingly, in a condition that the solenoid 39 is not energized, the magnitude of the brake pedal pressing force is multiplied by the predetermined boost ratio, with the result that the booster 1 is operated as a normal booster.

On the other hand, in the automatic braking in which the solenoid 39 is energized, in dependence upon magnitude of the electric current supplied to the solenoid 39, first of all, the armature 13 is shifted to the right in FIG. 1 in opposition to the spring force of the returning spring (movable member returning spring) 79. As the armature 13 is shifted to the right in FIG. 1, the space 80 is formed at the left side (FIG. 1) of the armature 13, which space 80 is communicated with the constant pressure chamber 5 through the passage T3 to be maintained to the constant pressure condition. When the electric current is increased, if the magnetic force acting on the armature 13 exceeds a total value of the spring force of the armature returning spring 79, the spring force of the valve biasing spring 30 and differential pressure (acting on the armature 13) between the space 80 and the spaces 70, 71 (in the initial condition, since the constant pressure chamber 5 and the variable pressure chamber 6 are both in low pressure conditions, there is no differential pressure), the distal end of the valve member 28 is shifted to the right in FIG. 1 via the cylindrical member 31 to open the atmospheric valve 34, thereby introducing air into the variable pressure chamber 6.

Consequently, the pressure difference is created between the variable pressure chamber 6 and the constant pressure chamber 5, with the result that the valve body 9 is advanced to generate the thrust force on the output rod 51, thereby starting the braking action.

In accordance with this, when air is introduced into the variable pressure chamber 6, since the pressure of the variable pressure chamber 6 is introduced into the spaces 70, 71, the differential pressure acting toward a direction along which the armature 13 is returned to the left in FIG. 1 (i.e., direction opposite to a direction of the electromagnetic force acting on the armature 13) is created between the space 80 and the spaces 70, 71.

As a result, when the electromagnetic force acting on the armature 13 is constant, the armature 13 is returned to the left in FIG. 1 by this differential pressure. When the electromagnetic force acting on the armature 13 becomes equal to (i.e., is balanced with) the differential pressure (acting on the armature 13) between the space 80 and the spaces 70, 71, the shifting movement of the armature 13 to the left in FIG. 1 is stopped, thereby closing the atmospheric valve 34. Further, from this condition, if the magnitude of the electric current supplied to the solenoid 39 is increased or decreased to cause imbalance between the differential pressure acting on the armature 13 and the magnitude of the electromagnetic force generated in the solenoid 39 again, the armature 13 is shifted again to balance the differential pressure with the electromagnetic force, with the result that the atmospheric valve 34 is opened again or the vacuum valve 32 is opened in place of the atmospheric valve 34, thereby adjusting the pressure in the variable pressure chamber 6 in accordance with the magnitude of the electric current supplied to the solenoid 39.

In this way, in proportion to the electric current supplied to the solenoid 39, booster pressure proportional to the differential pressure between the constant pressure chamber 5 and the variable pressure chamber 6, i.e., the magnitude of the electric current supplied to the solenoid 39 can be obtained.

Thus, since the booster pressure proportional to the electric current supplied to the solenoid 39 can be obtained without providing a sensor such as the master cylinder pressure sensor which was required in the conventional techniques for controlling the booster pressure to the desired value, it is not required to provide a new sensor additionally, and, thus, the construction can be simplified and the booster can be made cheaper.

Further, since the booster pressure proportional to the electric current supplied to the solenoid 39 can be obtained, by changing the electric current supplied to the solenoid 39 within a wide range, the booster pressure can be adjusted within a wide range.

Next, a second embodiment of the present invention will be explained with reference to FIGS. 3 and 4.

A booster 1 according to the second embodiment differs from that of the first embodiment in the following points:

(1) The valve seal of the vacuum valve 32 is constituted by an end 81 of the opening of the other end of the passage T1, in place of the valve seat portion 76 of the cylindrical member 31.

(2) An atmospheric valve cylinder 82 is provided at the end of the armature 13, and the valve seat of the atmospheric valve 34 is constituted by the atmospheric valve cylinder 82, in place of the plunger flange 33.

(3) The plunger 11 is provided with a seal member 83 slidingly contacted with the atmospheric valve cylinder 82.

(4) The intermediate member 60 and the passage T3 are omitted or eliminated.

(5) The output rod fitting member 50 is modified so that it is provided with the intermediate member body 61 and the intermediate member flange 62 of the intermediate member 60, and the output rod fitting portion 50 is provided with a bore (not numbered) open to the reaction disc 68 side and the armature 13 side, and a rod (reaction force rod; reaction force transmitting member) 84 is inserted so that a part of the reaction force of the reaction disc 68 (predetermined fraction of the reaction force of the reaction disc 68) is transmitted to the armature 13.

Figure 4:
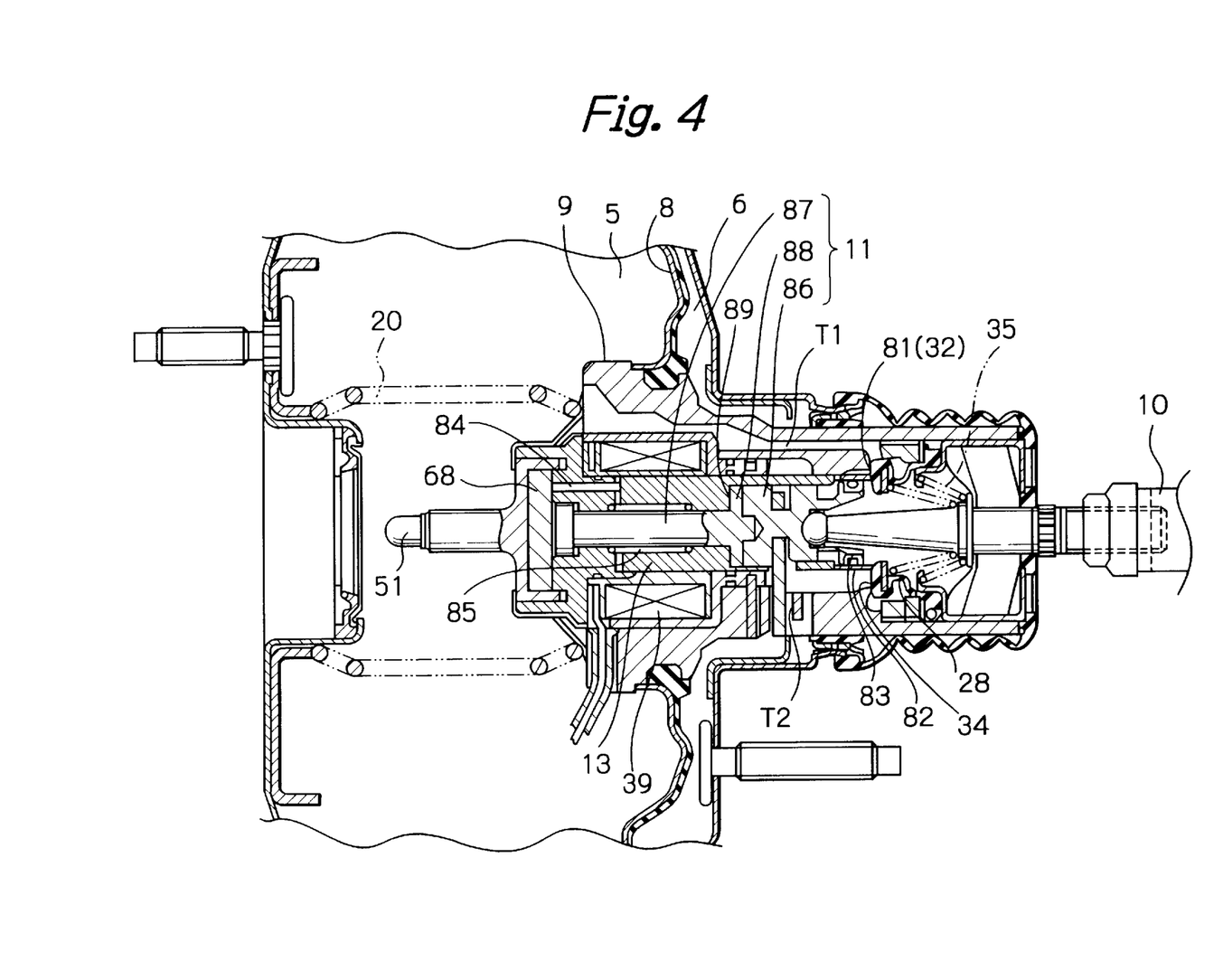
FIG. 4 is a partial enlarged view of FIG. 3.

(6) In the first embodiment, while an example that the armature 13 is shifted to the right in FIG. 1 by energizing the solenoid 39 to open the atmospheric valve 34 was explained, in place of this, the armature 13 is shifted to the left in FIG. 4 (toward a front side) to open the atmospheric valve 34.

(7) A spring (armature biasing spring) 85 is disposed between the output rod fitting member 50 and the armature 13 to bias them away from each other.

(8) The plunger 11 is constituted by a plunger body 86 connected to the input rod 10, and a plunger shaft 87 connected to the plunger body 86 and inserted into the armature 13, and a flange (plunger shaft flange) 88 is formed at a connecting portion between the plunger shaft 87 and the plunger body 86, and the plunger shaft flange 88 is disposed between an inner stepped portion 89 of the armature 13 and the plunger body 86, so that the armature 13 follows the shifting movement of the plunger 11 to the left in FIG. 4.

Figure 3:
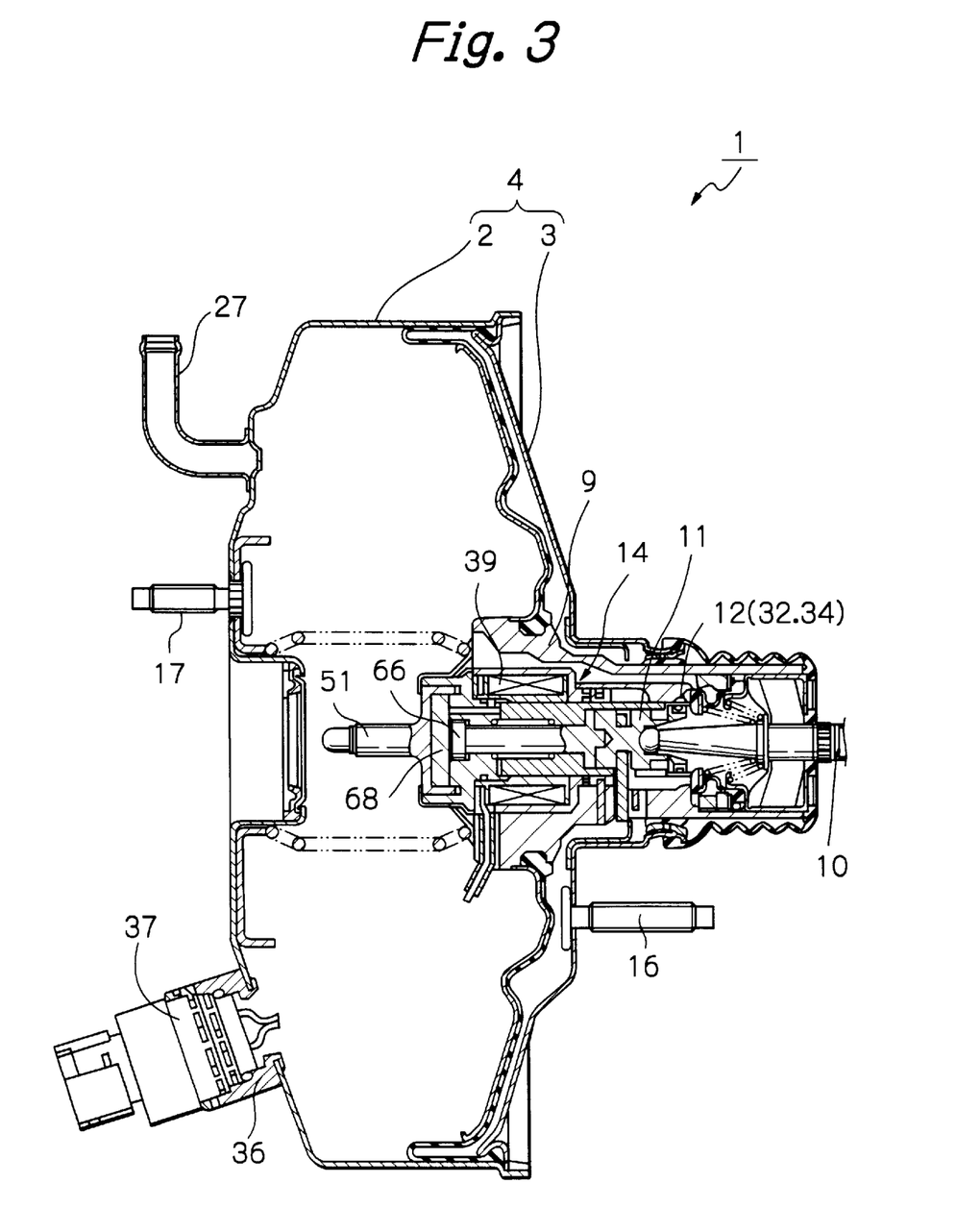
FIG. 3 is a sectional view showing a booster according to a second embodiment of the present invention.

In the booster 1 according to the second embodiment, in dependence upon the magnitude of the electric current supplied to the solenoid 39, first of all, the armature 13 moves to the left in FIG. 3 while urging the reaction disc 68 via the rod (reaction force transmitting rod) 84. When the armature 13 is shifted to the left in FIG. 3 by a predetermined amount, the atmospheric valve 34 is opened to introduce air into the variable pressure chamber 6.

Consequently, the pressure difference is created between the variable pressure chamber 6 and the constant pressure chamber 5, with the result that the thrust force is generated on the power piston 8 (valve body 9) to advance the valve body 9 and thus the output rod 51, thereby starting the braking action.

In accordance with this, when air is introduced into the variable pressure chamber 6, the reaction force based on the thrust force of the power piston 8 (valve body 9) due to the differential pressure created between the variable pressure chamber 6 and the constant pressure chamber 5 acts on the armature 13 along a direction (right in FIG. 4) opposite to a direction (left in FIG. 4) of the electromagnetic force acting on the armature 13), thereby returning the armature 13 to the right in FIG. 4

As a result, when the electromagnetic force acting on the armature 13 is constant, the armature 13 is returned to the right in FIG. 3 by the reaction force. When the electromagnetic force acting on the armature 13 becomes equal to (i.e., is balanced with) the reaction force acting on the armature 13, the shifting movement of the armature 13 to the right in FIG. 3 is stopped, thereby closing the atmospheric valve 34. Further, from this condition, if the magnitude of the electric current supplied to the solenoid 39 is increased or decreased to cause imbalance between the reaction force acting on the armature 13 and the magnitude of the electromagnetic force generated in the solenoid 39 again, the armature 13 is shifted again to balance the reaction force with the electromagnetic force, with the result that the atmospheric valve 34 is opened again or the vacuum valve 32 is opened in place of the atmospheric valve 34, thereby adjusting the pressure in the variable pressure chamber 6 in accordance with the magnitude of the electric current supplied to the solenoid 39.

In this way, in proportion to the electric current supplied to the solenoid 39, booster pressure proportional to the differential pressure between the constant pressure chamber 5 and the variable pressure chamber 6, i.e., the magnitude of the electric current supplied to the solenoid 39 can be obtained.

Thus, since the booster pressure proportional to the electric current supplied to the solenoid 39 can be obtained without providing a sensor such as the master cylinder pressure sensor which was required in the conventional techniques for controlling the booster pressure to the desired value, it is not required to provide a new sensor additionally, and, thus, the construction can be simplified and the booster can be made cheaper.

Further, since the booster pressure proportional to the electric current supplied to the solenoid 39 can be obtained, by changing the electric current supplied to the solenoid 39 within a wide range, the booster pressure can be adjusted within a wide range.

According to the first aspect of the present invention, since the electromagnetic biasing means has the movable member for operating the valve mechanism independently from the operation of the input rod and the differential pressure between the variable pressure chamber and the constant pressure chamber imparts the force corresponding to the output of the booster on the movable member, the differential pressure between the variable pressure chamber and the constant pressure chamber and thus the booster output having magnitude corresponding to (for example, proportional to) the magnitude of the current supplied to the electromagnetic biasing means can be obtained. Thus, since the booster pressure proportional to the electric current supplied to the electromagnetic biasing means can be obtained without providing a sensor such as the master cylinder pressure sensor which was required in the conventional techniques for controlling the booster pressure to the desired value, it is not required to provide a new sensor additionally, and, thus, the construction can be simplified and the booster can be made cheaper.

Further, since the booster pressure proportional to the electric current supplied to the electromagnetic biasing means can be obtained, by changing the electric current supplied to the electromagnetic biasing means within a wide range, the booster pressure can be adjusted within a wide range. According to the second aspect of the present invention, since the electromagnetic biasing means has the movable member for operating the valve mechanism independently from the operation of the input rod and the part of the reaction force of the reaction disc acts on the operating force of the movable member, the differential pressure between the variable pressure chamber and the constant pressure chamber and thus the booster output having magnitude corresponding to (for example, proportional to) the magnitude of the current supplied to the electromagnetic biasing means can be obtained. Thus, since the booster pressure proportional to the electric current supplied to the electromagnetic biasing means can be obtained without providing a sensor such as the master cylinder pressure sensor which was required in the conventional techniques for controlling the booster pressure to the desired value, it is not required to provide a new sensor additionally, and, thus, the construction can be simplified and the booster can be made cheaper.

Further, since the booster pressure proportional to the electric current supplied to the electromagnetic biasing means can be obtained, by changing the electric current supplied to the electromagnetic biasing means within a wide range, the booster pressure can be adjusted within a wide range.

What is claimed is:

1. A booster comprising:

a housing;

a power piston dividing the interior of the housing into a constant pressure chamber and a variable pressure chamber;

a valve body supported by said power piston;

a plunger provided in said valve body for axial movement;

an input rod interconnecting a brake pedal and said plunger so that the operation of the brake pedal is transmitted to the plunger to cause its axial movement;

a valve mechanism provided in said valve body for controlling supply of operating fluid to said variable pressure chamber in response to the axial movement of said plunger so that a thrust output force is generated by pressure difference created between said variable pressure chamber and said constant pressure chamber based on the operation of said valve mechanism; and an electromagnetic biasing device including a movable member slidably provided in said valve body and having one end for operating said valve mechanism independently from the operation of said input rod, wherein, said electromagnetic biasing device is so arranged that the pressure in said variable pressure chamber acts on said one end of said movable member and the pressure in said constant pressure chamber acts on the other end of said movable member.

2. A booster according to claim 1, wherein said valve mechanism includes an operating fluid valve which, when opened, permits the variable pressure chamber to communicate with a source of the operating fluid, a vacuum valve which, when opened, permits communication between said variable and constant pressure chambers and a valve member biased to close said operating fluid and vacuum valves, said plunger having a portion forming a valve seat for said operating fluid valve and said movable member having a portion engaging with said valve member so that the movable member, when actuated, moves said valve member to separate from said valve seat.

3. A booster according to claim 2, wherein said portion of the movable member engaging with said valve member also functions as a valve seat for said vacuum valve and when said valve body is advanced due to the pressure difference between said constant and variable pressure chambers, said valve seat portion of the plunger moves said valve member away from said movable member portion to open said vacuum valve.

4. A booster according to claim 1, wherein said operating fluid is air and said source of the operating fluid is atmosphere.

5. A booster comprising:

a housing;

a power piston dividing the interior of the housing into a constant pressure chamber and a variable pressure chamber;

a valve body supported by said power piston;

a plunger provided in said valve body for axial movement;

an input rod interconnecting a brake pedal and said plunger so that the operation of the brake pedal is transmitted to the plunger to cause its axial movement;

a valve mechanism provided in said valve body for controlling supply of operating fluid to said variable pressure chamber in response to the axial movement of said plunger so that a thrust output force is generated by pressure difference created between said variable pressure chamber and said constant pressure chamber based on the operation of said valve mechanism;

a reaction member for transmitting said thrust output force to said input rod; and an electromagnetic biasing device including a movable member slidably provided in said valve body and having one end for operating said valve mechanism independently from the operation of said input rod, wherein, the booster further includes a reaction transmission member which transmits a portion of the reaction force created by said reaction member to the other end of said movable member.

6. A booster according to claim 5, wherein said valve mechanism includes an operating fluid valve which, when opened, permits the variable pressure chamber to communicate with a source of the operating fluid, a vacuum valve which, when opened, permits communication between said variable and constant pressure chambers and a valve member biased to close said operating fluid and vacuum valves, said movable member having a portion forming a valve seat for said operating fluid valve which portion moves away from said valve member when said electromagnetic device is actuated.

7. A booster according to claim 6, wherein said movable member and said plunger have portions engageable with each other so that when the plunger is advanced, said portion of the movable member forming the valve seat moves away from said valve member.

8. A booster according to claim 7, wherein said valve body has a portion forming a valve seat for said vacuum valve and said reaction force acting on said movable member tends to move said valve member away from said valve seat of the vacuum valve.

9. A booster according to claim 5 wherein said operating fluid is air and said source of the operating fluid is atmosphere.

10. A booster according to claim 2, wherein said operating fluid is air and said source of the operating fluid is atmosphere.

11. A booster according to claim 3, wherein said operating fluid is air and said source of the operating fluid is atmosphere.

12. A booster according to claim 6, wherein said operating fluid is air and said source of the operating fluid is atmosphere.

13. A booster according to claim 7, wherein said operating fluid is air and said source of the operating fluid is atmosphere.

14. A booster according to claim 8, wherein said operating fluid is air and said source of the operating fluid is atmosphere.

* * * * *